United States Patent [19]

Shiraishi et al.

[11] Patent Number: 5,333,058
[45] Date of Patent: Jul. 26, 1994

[54] YAW MOTION CONTROL DEVICE

[75] Inventors: Shuji Shiraishi; Hironobu Kiryu, both of Wako, Japan

[73] Assignee: Honda Giken Kogyo Kabushiki Kaisha, Tokyo, Japan

[21] Appl. No.: 594,906

[22] Filed: Oct. 9, 1990

Related U.S. Application Data

[62] Division of Ser. No. 403,068, Sep. 5, 1989, Pat. No. 5,001,636.

[30] Foreign Application Priority Data

| Mar. 9, 1987 | [JP] | Japan | 62-053501 |
| Mar. 9, 1987 | [JP] | Japan | 62-053502 |
| Mar. 9, 1987 | [JP] | Japan | 62-053503 |
| Oct. 3, 1987 | [JP] | Japan | 62-250167 |
| Oct. 3, 1987 | [JP] | Japan | 62-250168 |
| Oct. 3, 1987 | [JP] | Japan | 62-250169 |

[51] Int. Cl.$^5$ ............................................. B60T 8/32
[52] U.S. Cl. ...................... 364/424.05; 180/142; 364/426.02; 303/103; 280/91
[58] Field of Search ............ 364/424.01, 424.05, 364/426.02, 426.03, 426.05, 434, 435; 303/103; 280/91, 771; 180/140, 142; 73/146, 178 R

[56] References Cited

U.S. PATENT DOCUMENTS

| 4,412,594 | 11/1983 | Furukawa et al. | 180/142 |
| 4,679,808 | 7/1987 | Ito et al. | 364/424.01 |
| 4,705,130 | 11/1987 | Fukunaga et al. | 280/91 |
| 4,706,771 | 11/1987 | Kawabe et al. | 364/424.05 |
| 4,706,979 | 11/1987 | Kawabe et al. | 280/91 |
| 4,718,685 | 1/1988 | Kawabe et al. | 280/91 |
| 4,768,602 | 9/1988 | Inoue et al. | 180/140 |
| 4,778,023 | 10/1988 | Sugasawa | 180/140 |
| 4,794,539 | 12/1988 | Wallentowitz et al. | 364/426.01 |
| 4,797,823 | 1/1989 | Ikemoto et al. | 364/424.05 |

FOREIGN PATENT DOCUMENTS

| 1297976 | 11/1972 | European Pat. Off. . |
| 0150856 | 8/1985 | European Pat. Off. . |
| 0236947 | 11/1987 | European Pat. Off. . |
| 60-191875 | 2/1986 | Japan . |

OTHER PUBLICATIONS

Patent Abstracts of Japan No. 60124571, vol. 9, No. 282, Nov. 9, 1985.
Patent Abstracts of Japan No. 62261575 vol. 12 No. 14, Apr. 28, 1988.

*Primary Examiner*—Thomas G. Black
*Attorney, Agent, or Firm*—Armstrong, Westerman, Hattori, McLeland & Naughton

[57] ABSTRACT

A yaw motion control device for a vehicle includes a steering angle sensor for detecting the steering angle of a steering wheel of the vehicle and a steering angle memory means operatively connected to the steering angle sensor for storing at least a previous value of the steering angle. A reference yaw rate generator generates a reference yaw rate in response to an input from the steering angle memory, and a yaw rate detector detects the yaw rate of the vehicle. Further, a yaw motion corrector controls the yaw motion of the vehicle in response to the outputs from the reference yaw rate generator means and the yaw rate detector. The yaw motion control device set forth above can also be employed with a vehicle speed detector for detecting the speed of the vehicle, and for outputting the vehicle speed to said reference yaw rate generator to provide greater accuracy in controlling the yaw motion of the vehicle.

8 Claims, 4 Drawing Sheets

YAW MOTION CONTROL DEVICE

This is a division of application Ser. No. 403,068 filed Sep. 5, 1989, and now U.S. Pat. No. 5,001,636.

BACKGROUND OF THE INVENTION

The instant invention relates to a yaw motion control device for a vehicle. More specifically, the instant invention relates to controlling the yaw motion of a vehicle when an undesirable yaw motion is sensed.

Conventionally, anti-lock brakes have been known as a control device for controlling the yaw motion of a vehicle. Of course, anti-lock brakes are primarily directed to the controlling of braking performance. By preventing the locking-up of the brakes, in respect to controlling yaw motion, the anti-lock brakes simply function to prevent a reduction in side resistant force of the tires. In other words, the operation of the anti-lock brakes functions to prevent the loss of lateral traction of the tires so that the driver can maintain control of the vehicle under braking. Thus the anti-lock brakes only function as a yaw motion control device during braking. In order to fulfill the need for a more complete yaw motion control device for a vehicle, it would be advantageous to provide a yaw motion control device which operates even in situations when the brakes are not applied.

SUMMARY OF THE INVENTION

In view of the above problems, an object of the instant invention is to provide a yaw motion control device for a vehicle which is designed to detect if the yaw rate of the vehicle has exceeded a predetermined yaw rate value, and accordingly to control the yaw motion of the vehicle.

According to one aspect of the instant invention, a yaw motion control device comprises a yaw rate detecting means for detecting a yaw rate of the vehicle, a steering angle sensor for detecting a steering angle of the steering wheel of the vehicle, a reference yaw rate generating means for generating a reference yaw rate according to an output from the steering angle sensor, and a yaw motion correcting means for controlling the yaw motion of the vehicle according to an output from the reference yaw rate generating means and an output from the yaw rate detecting means.

According to another aspect of the instant invention, a yaw motion control device for a vehicle comprises detecting means for detecting a yaw rate of the vehicle, a steering angle sensor for detecting a steering angle of the steering wheel of the vehicle, a reference yaw rate generating means for generating a reference yaw rate according to an output from the steering angle sensor and an output from the yaw rate detecting means, and a yaw motion correcting means for controlling the yaw motion of the vehicle according to an output from the reference yaw rate generating means and an output from the yaw rate detecting means.

Thus, in accordance with the above description of the invention, a reference yaw rate to be presently desired is presumed from a steering angle, and it can be detected that a present yaw rate is not a desired value according to a slippage between the reference yaw rate and the present yaw rate. On the basis of the detected result, the yaw motion can be controlled. Further, the yaw motion of the vehicle can be more precisely controlled when the reference yaw rate is determined from the detected yaw rate and the steering angle.

Another aspect of the yaw motion control device in accordance with the instant invention includes a yaw rate detecting means for detecting a yaw rate of the vehicle, a reference yaw rate generating means for generating a reference yaw rate based on the hysteresis (or the most recent past values or history) of said yaw rate, and a yaw motion correcting means for controlling the yaw motion of the vehicle according to an output from the reference yaw rate generating means and an output from the yaw rate detecting means, or the hysteresis of the yaw rate detecting means. Accordingly, a reference yaw rate to be presently desired is assumed from hysteresis of the detected yaw rate, and it can be detected that a present yaw rate is not the desired value according to a slippage between the reference yaw rate and the present yaw rate. On the basis of the detected slippage, the yaw motion can be controlled, if the slippage exceeds a predetermined value.

Thus, in accordance with the above described aspect including the hysteresis function, it is possible to detect that a yaw rate is not a desired value, from a detected yaw rate and a desired yaw rate obtained according to the steering angle, and thereby controlling the yaw motion. Moreover, the control of the yaw motion can be changed according to a steering angle, thereby controlling the yaw motion. Moreover, the control of the yaw motion can also be changed according to a steering characteristic indicating an oversteering or understeering condition. Accordingly, when the tendency of oversteering occurs, even in a front wheel drive vehicle, it is possible to prevent the undesirable yaw motion of the vehicle.

One method of controlling the yaw motion of a vehicle is to cut the fuel supply to the engine, thus reducing the driving force of the vehicle. The control of the yaw motion of a yaw motion control device described above is conducted according to a deviation between the yaw rate detected from a difference in the wheel speeds between trailing wheels of the vehicle and a reference yaw rate and the steering angle of the steering wheel. However, when the tendency of oversteering occurs in a front wheel drive vehicle, the above yaw motion control device may induce an over-control condition. Another aspect of this invention is provided to overcome the above over-controlling condition. Further, a more accurate yaw motion control device is obtained in accordance with of this invention in which yaw motion is controlled according to a steering characteristic when a yaw rate of the vehicle has exceeded a predetermined limit.

Accordingly, in accordance with the above described aspect of the invention which also monitors the steering characteristic, a yaw motion control device is provided which includes a yaw rate detecting means for detecting a yaw rate of the vehicle, a steering angle sensor for detecting a steering angle of the steering wheel of the vehicle, a reference yaw rate generating means for generating a reference yaw rate according to an output from the steering angle sensor, a steering characteristic determining means for determining a steering characteristic of the vehicle according to an output from the reference yaw rate generating means and an output from the yaw rate detecting means, a yaw motion correcting means for controlling the yaw motion of the vehicle according to an output from the reference yaw rate generating means and an output from the yaw rate detecting means, and a control characteristic correcting means for changing a control characteristic of the yaw motion correcting means according to an output from the steering characteristic determining means.

It should be noted that the steering characteristic of the vehicle is nonlinear when the vehicle is traveling at a low speed and when the steering angle is large, while the yaw motion controller described above generates the reference yaw rate by a linear function. Accordingly, the deviation of a detected yaw rate from the reference yaw rate increases causing excessive control of the yaw rate. If the reference yaw rate is set to a large value in order to prevent such excessive yaw rate control during low speed traveling of the vehicle, insufficient yaw rate control will result during the high speed traveling of the vehicle. This occurs because the yaw rate varies greatly even if the steering angle is small during the high speed traveling of the vehicle.

According to another aspect of the invention, a yaw motion control device for a vehicle, comprises a yaw rate detecting means for detecting a yaw rate of the vehicle; a steering angle sensor for detecting a steering angle of the steering wheel; a reference yaw rate generating means for generating a reference yaw rate according to an output from the steering angle sensor; a vehicle speed detector for detecting the vehicle speed; a yaw motion correcting means for controlling the yaw motion of the vehicle according to an output from the reference yaw rate generating means and an output from the yaw rate detecting means; and a control characteristic correcting means for changing a control characteristic of the yaw motion correcting means according to an output from the vehicle speed detector.

Thus, according to the above aspect of the invention which includes a control characteristic correcting means, it is possible to detect that a yaw rate is not a desired value, from a detected yaw rate and a desired yaw rate obtained according to the steering angle, and to thereby control the yaw motion. Moreover, the control of the yaw motion can be altered according to the vehicle speed. Therefore, it is possible to control the precise yaw motion of the vehicle in accordance with the vehicle speed.

In some vehicles, the driving mode can be changed from a two-wheel drive mode to a four-wheel drive mode and vice versa, or the driving force distribution ratio between the front and rear wheels can be varied. In such a vehicle, the yaw motion control characteristics must properly be varied according to the change of the driving wheels or according to the variation of the driving force distribution ratio. Nevertheless, a conventional yaw motion controller is not capable of varying the yaw motion control characteristics according to the driving mode or to the variation of the driving force distribution ratio.

According to another aspect of this invention a yaw motion controller for a vehicle is capable of properly controlling the yaw motion of the vehicle by varying the control characteristics thereof depending on the working driving wheels and the driving force distribution ratio.

More specifically, such a yaw motion control device includes yaw rate detecting means for detecting the yaw rate of the vehicle, a steering angle detector for detecting the steering angle of the steering wheel, a reference yaw rate generating means for generating a reference yaw rate on the basis of the output of the steering angle detector, a driving force distribution ratio detecting means for detecting the driving force distribution ratio between the front and rear wheels, a yaw motion correcting means for properly controlling the yaw motion of the vehicle on the basis of the respective outputs of the reference yaw rate detecting means and the yaw rate detecting means, and control characteristics correcting means for varying the control characteristics of the yaw motion correcting means according to the driving force distribution ratio detecting means.

Thus, according to the above described aspect of the invention which includes a correction based on the power distribution between the front and rear wheels, it is possible to detect that a yaw rate is not a desired value, from a detected yaw rate and a desired yaw rate obtained according to a steering angle and to thereby control the yaw motion. In this aspect, as well as others, an actual yaw rate sensor such as a rate gyroscope or the like, as well as a yaw rate sensor as described in detail below, may be employed to detect the yaw rate. Moreover, since the yaw motion control correcting means is changed according to the output of the driving force distribution ratio detecting means, the yaw motion of the vehicle can be properly controlled depending on whether the front wheels are the driving wheels or whether the rear wheels are the driving wheels, and according to the driving force distribution ratio between the front and rear wheels.

Ordinarily, the yaw rate of a vehicle, as described above, is detected by a rate gyroscope. However, since a rate gyroscope is, in general, expensive and requires that the ambient temperature be maintained at a predetermined temperature, such a rate gyroscope has never been practically applied to controlling the motion of a vehicle such as an automobile. Although the yaw rate is related to the steering angle, it is hardly possible to estimate the yaw rate from the steering angle, because the variation of the yaw rate responds to a variation in the steering angle with a delay, and the delay is dependent on the coefficient of friction between the tires and the road surface, and the speed of the vehicle.

Theoretically, the yaw rate of a vehicle is proportional to the difference between the ground speed of the right side and the left side of the vehicle, provided that the side slip angle of the tires is small. Generally, the side slip angle of a tire is negligibly small, such as five degrees or less under a normal traveling condition of the vehicle. Accordingly, the yaw rate of a vehicle can be approximated on the basis of the difference between the ground speed of the right side and left side of the vehicle. Thus the instant invention also provides a yaw rate detecting device capable of easily and practically detecting the yaw rate of a vehicle.

Motor vehicles run on rough roads as well as smooth roads. On a rough road, the wheel speed of the vehicle varies by resonance due to vibrations of the suspension of the vehicle and thereby the reliability of the approximation of yaw rate on the basis of the ground speed is diminished. Accordingly, the instant invention also provides for an improved yaw rate detecting device capable of detecting the yaw rate of a vehicle with high accuracy, regardless of vibrations of the vehicle suspension.

A yaw rate detecting device in accordance with the instant invention comprises speed detectors respectively for individually detecting the ground speed of the right side of the vehicle and the ground speed of the left side of the vehicle, and speed difference calculating means for calculating the difference between the respective detected speed values of the speed detectors, to determine the yaw rate of the vehicle on the basis of the difference between ground speeds of the right and left sides. To more precisely determine the yaw rate, in accordance with the instant invention, the yaw rate detecting device further comprises a filter connected to the speed difference calculating means to filter frequency components beyond a predetermined frequency from the output of the speed difference calculating means in order to determine a yaw rate free from the interference of suspension vibration.

Thus the above yaw rate detecting device has a simple structure and approximates the vehicle yaw rate on the basis of the difference between the ground speed of the right and the left wheels of the vehicle. Further, to more precisely determine the vehicle yaw rate, the yaw rate detecting device described above also eliminates the adverse influence of the suspension vibration on the detection of yaw rate by the addition of the above-described filter.

BRIEF DESCRIPTION OF THE DRAWINGS

The advantages of the invention will become apparent in the following description taken in conjunction with the drawings, wherein.

DETAILED DESCRIPTION OF THE PREFERRED EMBODIMENT

Figure 1:
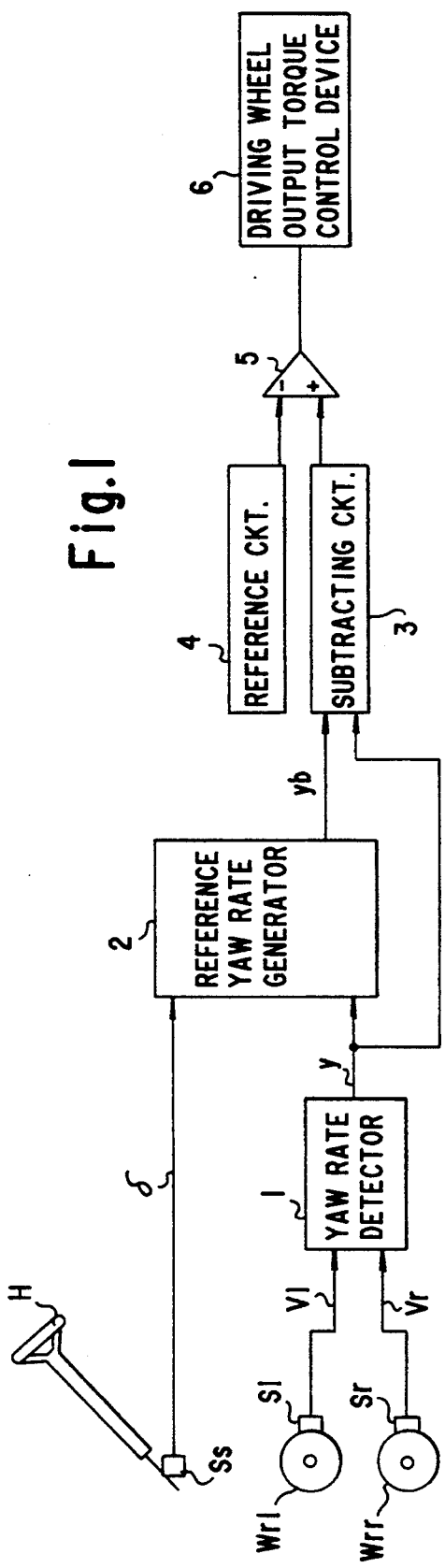
FIG. 1 is a block diagram of a first embodiment of the instant invention.

With reference to FIG. 1, left and right rear wheels Wlr and Wrr are illustrated as trailing wheels in a front wheel drive vehicle and are provided with independent speed sensors Sl and Sr, respectively. Output signals from speed sensors Sl and Sr are input to a yaw rate detecting means 1. An output from the yaw rate detecting means 1 is input to a reference yaw rate generating means 2, and is also input to a subtracting means 3. A steering wheel H is provided with a steering angle sensor Ss, and an output from the steering angle sensor Ss is input to the reference yaw rate generating means 2. An output from the reference yaw rate generating means 2 is input to the subtracting means 3, and an output from subtracting means 3 is input to a non-inverting input terminal of a comparator 5. On the other hand, a reference value from a reference circuit 4 is input to an inverting input terminal of the comparator 5. An output from comparator 5 is input to a driving wheel output torque control device 6, e.g., an engine output control device such as a yaw motion correcting means.

Figure 2:
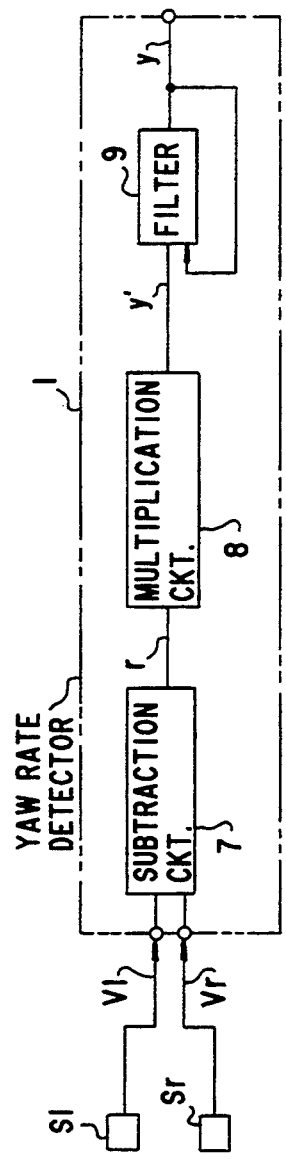
FIG. 2 is a block diagram of the yaw rate detecting means shown in FIG. 1.

Referring to FIG. 2, the yaw rate detecting means 1 includes a subtraction circuit 7, a multiplication circuit 8 and a filter 9. The subtraction circuit 7 detects a difference r (where r=Vr−Vl) between wheel speeds Vr and Vl detected by the speed sensors Sr and Sl. Multiplication circuit 8 multiplies the difference r by a certain proportional constant d to obtain an approximate value y′ of a yaw rate. The proportional constant d is the track of the rear wheels Wlr and Wrr (i.e., the distance between center lines of the rear wheels), which is d=1, for example. The filter 9 serves to eliminate the influence of vibration of the vehicle suspension, such as vertical directional vibration of the suspension, to the wheel speeds Vl and Vr, and which is a recursive type filter (auto recursive and moving average filter). The fluctuation of wheel speeds Vl and Vr due to resonance of wheel vibration and suspension vibration during travel on a rough road is about 10 Hz, and a frequency range of the yaw rate employable for the control of vehicle motion is 0–2 Hz. Because of the above frequencies, filter 9 operates to filter the approximate value y′ of the yaw rate, with a frequency range of 2 Hz or more used as a reduction range. Filter 9 generates an output $Y_n$ as calculated in accordance with the following expression:

$$Y_n = a_1{}^*y_{n-1} + a_2{}^*y^*{}_{n-2} + a_3 y_{n-3} + \beta_1{}^*y'_n + \beta_2{}^*y'_{n-1} + \beta_3{}^*y'_{n-2} \quad (1)$$

Where, $a_1 \ldots a_3$ and $\beta_1 \ldots \beta_3$ are constants determined by experimentation, and the suffixes n, n−1 and n−2 stand for a present value and a previous value, etc. in each cycle (e.g., 15 msec), where the calculation in filtering is repeated.

The reference yaw rate generating means 2 serves to calculate a reference yaw rate $y_b$ to be presently desired according to the hysteresis (or recent previous values) of a steering angle $\delta(\delta_{n-1}, \delta_{n-2})$ obtained by the steering angle sensor Ss and the hysteresis of the yaw rate $y(y_{n-1}, y_{n-2})$ obtained by the yaw rate detecting means 1. The reference yaw rate $y_b$ is calculated in accordance with the following expression:

$$y_b = -a_1{}^*y_{n-1} - a_2{}^*y_{n-2} + b_1{}^*\delta_{n-1} + b_2{}^*\delta_{n-2} \quad (2)$$

where, $a_1$, $a_2$, $b_1$ and $b_2$ stand for parameters which change with vehicle speed, and they are preliminary given in a map as follows:

$a_1 = -1.4 - +1.8$
$a_2 = +0.5 - +0.8$
$b_1 = +0.01 - -0.0008$
$b_2 = +0.009 - +0.001$

The subtracting means 3 calculates an absolute value $|y_b - y_n|$ of the difference between the reference yaw rate $y_b$ and the yaw rate y. That is, a slippage between the presently desired yaw rate $y_b$ and the present yaw rate $y_n$ is calculated, and the slippage is compared in comparator 5 with a reference value $\Delta y$ set by the reference circuit 4. Then, the engine output is controlled by the engine output control device 6 according to the result of the comparison. Further, the reference value $\Delta y$ is determined in response to vehicle speed beforehand.

In operation, the yaw rate y of the vehicle is obtained by multiplying the difference (Vr−Vl) in wheel speeds between the left and right trailing wheels Wlr and Wrr by the proportional constant d, and then filtering the product to eliminate the influence of the vehicle suspension and vibration. Thus, the yaw rate y can be easily obtained with no problems in practical use.

Then, the difference between the yaw rate y as presumed above and the reference yaw rate $y_b$ calculated as a presently desired value according to the hysteresis of the steering angle and the yaw rate y is compared with the reference value Δy, thereby predicting that the vehicle will yaw in an undesirable direction. Thus, the yaw motion may be controlled in accordance with the above prediction.

In a front wheel drive vehicle, for example, when an excessive driving force is applied when the vehicle is being steered, the vehicle tends to understeer. As a result, when it is detected that the vehicle has yawed in an undesirable direction, the engine output control device 6 operates in response to the output from comparator 5 to reduce the engine output. In response to the reduction in engine output, the driving force transmitted to driving wheels is reduced, and therefore, the limited lateral adhesion of the driving wheels is increased, thereby preventing the understeering condition mentioned above.

On the other hand, in a rear wheel drive vehicle, the vehicle tends to oversteer when an excessive driving force is applied. However, the oversteering condition may also be prevented by reducing the driving force in the same manner as in the front wheel drive vehicle. Thus, when the actual yaw rate y has approached the reference yaw rate $y_b$ by reducing the engine output, that is, when the absolute value $|y_b-y_n|$ becomes smaller than the reference value Δy, the reduction in the engine output is released, and a normal engine output control is restored. As described above, the actual yaw rate y is controlled to be near the reference yaw rate $y_b$ by controlling the engine output, and is thus made to be in accord with the driver's desired yaw rate.

In a rear wheel drive vehicle, the difference in wheel speeds between trailing wheels, (which are the non-driven wheels) to be used in the calculation of the yaw rate y is the difference in wheel speeds between right and left front wheels which also serve as wheels that steer the vehicle.

The reduction in engine output by the engine control device 6 is achieved, for example, by controlling a suction throttle valve control device, driven by a pulse motor, or the like, to close a throttle value, decreasing or cutting the fuel supplied to the engine by a fuel control device, cutting or retarding the ignition timing by an engine ignition device, or reducing a supercharging pressure by a supercharging pressure control device for controlling the pressurized air to be supplied to the engine.

As described above, the instant invention in a first aspect includes a yaw rate detecting means for detecting a yaw rate of said vehicle, a steering angle sensor for detecting a steering angle for the steering wheel, a reference yaw rate generating means for generating reference yaw rate according to an output from the steering angle sensor, and a yaw motion correcting means for controlling a yaw motion of the vehicle according to an output from the reference yaw rate generating means and an output from the yaw rate detecting means. Therefore, it is possible to predict that the vehicle will yaw in an undesirable direction and thus control the yaw motion in response thereto.

In another aspect of the instant invention, the reference yaw rate generating means generates the reference yaw rate according to the output from the yaw rate detecting means and the steering angle sensor, instead of merely in response to the output from the steering angle sensor. Therefore, it is possible to more precisely control the yaw motion of the vehicle.

A second embodiment of the instant invention will now be described referring to FIG. 3. Some elements of FIG. 3 which correspond to FIG. 1, are labeled with the same reference numerals. Left and right trailing wheels Wl and Wr of a vehicle are provided with independent speed sensors 31*l* and 31*r*, respectively, and wheel speeds Vl and Vr detected by the speed sensors 31*l* and 31*r* are input to yaw rate detecting means 1 and to vehicle speed detector 33. A detected vehicle condition, such as the steering angle δ, is detected by the steering angle sensor 34. Another detected vehicle condition, such as the vehicle speed Vv, is generated by vehicle speed detector 33. The steering angle of steering wheel H from steering angle sensor 34, vehicle speed Vv from the vehicle speed detector 33, and a hysteresis of the yaw rate y obtained by the yaw rate detecting means 1 are input to a reference yaw rate generating means 2. The yaw rate y obtained by the yaw rate detecting means 1 and a reference yaw rate $y_b$ generated from the reference yaw rate generating means 2 are both input to a yaw motion correcting means 36. A deviation value Dr (where $Dr=y-y_b$) between the yaw rate y and the reference yaw rate $y_b$ is obtained in the yaw motion correcting means 36. The deviation value Dr and the reference yaw rate $y_b$ are both input to a steering characteristic determining means 37. The result of a determination by the steering characteristic determining means 37, the vehicle speed Vv from the vehicle speed detector 33 and the steering angle δ from the steering angle sensor 34 are input to a control characteristic correcting means 38. Further, the vehicle is provided with a switch 39 for switching an output voltage level to a high level or a low level depending on whether the driving wheels of the vehicle are the front wheels or the rear wheels. An output from switch 39 is input to a driving wheel determining circuit 10, and the output of the driving wheel determining circuit 10 is input to the control characteristic correcting means 38. The control characteristic correcting means 38 outputs a signal, depending on each input signal, to the yaw motion correcting means 36.

The yaw rate detecting means 1 includes a subtraction circuit 11 (also referred to as a calculating circuit), a multiplication circuit 12, a filter 13, a hysteresis accumulation circuit 14 (also referred to as an approximate value memory circuit) for accumulating an output hysteresis of multiplication circuit 12, and a hysteresis accumulation circuit 15 (also referred to as a yaw rate memory circuit) for accumulating an output hysteresis of filter 13. The subtraction circuit 11 provides a difference r between the wheel speeds Vl and Vr (where $r=Vr-Vl$) detected by the speed sensors 31*l* and 31*r*, and the multiplication circuit 12 multiplies the difference r by a certain proportional constant d to obtain an approximate value y' (where $y'=r*d$) of the yaw rate. The proportional constant d is the track (or the width between the center lines) of the trailing wheels Wl and Wr, wherein $d=1$, for example. Filter 13 serves to eliminate the influence of vibration of the vehicle suspension in determining wheels speeds Vl and Vr. Filter 13 is a recursive type filter. Since the fluctuation of wheel speeds Vl and Vr due to the resonance of wheel vibration and suspension vibration during travel on a rough road is about 10 Hz, and the frequency range of the yaw rate employable for the control of a vehicle motion is 0–2 Hz, filter 13 operates to filter the approximate value y' of the yaw rate, with a frequency range of 2 Hz or more used as a reduction range. Filter 13 generates an output $y_n$ as calculated in accordance with equation (1), set forth above. Equation (1) is reproduced below:

$$Y_n = a_1 {}^*y_{n-1} + a_2 {}^*y_{n-2} + a_3 {}^*y_{n-3} + \beta_1 {}^*y'_n + \beta_2 {}^*y'_{n-1} + \beta_3 {}^*y'_{n-2} \qquad (1)$$

where, $a_1 \ldots a_3$ and $\beta_1 \ldots \beta_3$ are constants determined by an experimentation and the suffixes n, n−1 ... n−3 stand for a present value and a previous value, etc. in each cycle where the calculation in filtering is repeated. A last value, a before-last value and so on of the approximate value y' of the yaw rate are input from the hysteresis accumulation circuit 14 to the filter 13, while a last value, a before-last value and so on of the yaw rate y are input from the hysteresis accumulation circuit 15 to the filter 13.

The vehicle speed detector 33 serves to output the vehicle speed Vv according to the wheel speeds Vl and Vr detected by the speed sensors 31*l* and 31*r*. For example, the larger value of both the wheel speeds Vl and Vr is output as the vehicle speed Vv.

Figure 4:
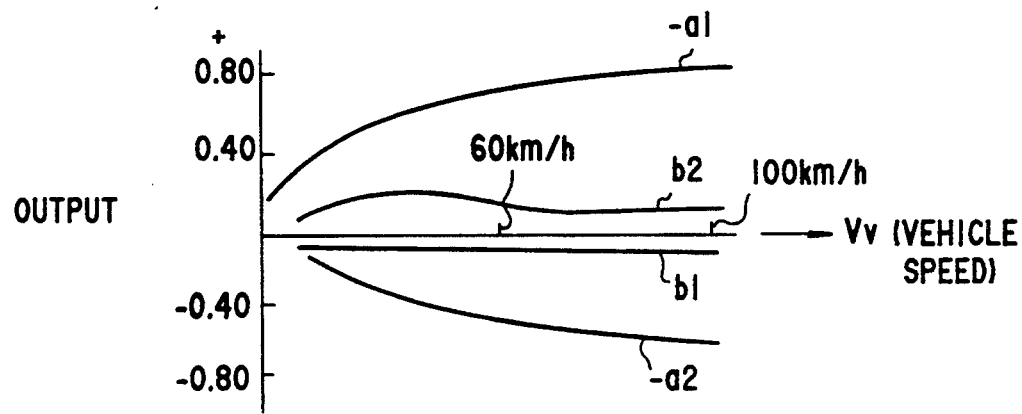
FIG. 4 is a graph illustrating output characteristics of the constant selection circuit.

The reference yaw rate generating means 2 includes a constant selection circuit 16 (also referred to as a steering response parameter circuit), a hysteresis accumulation circuit 17 (also referred to as a steering angle memory circuit) and an arithmetic circuit 18. The constant selection circuit 16 serves to select constants $a_1$, $a_2$, $b_1$ and $b_2$ to be used in the calculation in the arithmetic circuit 18 according to the vehicle speed Vv obtained by the vehicle speed detector 33. The constants $a_1$, $a_2$, $b_1$ and $b_2$ are defined as shown in FIG. 4, for example, and they are input to arithmetic circuit 18 according to the vehicle speed. The hysteresis accumulation circuit 17 is adapted to input the hysteresis of the steering angle $\delta$, as detected by steering angle sensor 34, to arithmetic circuit 18. Arithmetic circuit 18 serves to calculate a reference yaw rate $y_b$ to be presently desired according to the hysteresis of the yaw rate y from the hysteresis accumulation circuit 15 in the yaw rate detecting means 1 and the hysteresis of the steering angle $\delta$ from the hysteresis accumulation circuit 17. The reference yaw rate $y_b$ is calculated in accordance with equation (2) set forth above. Equation (2) is reproduced below:

$$y_b = -a_1 {}^*y_{n-1} - a_2 {}^*y_{n-2} + b_1 {}^*\delta_{n-1} + b_2 {}^*\delta_{n-2} \qquad (2)$$

The yaw rate correcting means 36 includes a deviation calculation circuit 19 for calculating a deviation value Dr (where Dr=y−$y_b$) between the yaw rate y obtained by the yaw rate detecting means 1 and the reference yaw rate $y_b$ obtained by the reference yaw rate generating means 2, an absolute value generating circuit 20 for generating an absolute value of the deviation Dr, first and second comparators 21 and 22 for receiving an output from the absolute value generating circuit 20 at their respective inverting input terminals, and a driving wheel output torque control circuit 23 connected to the respective output terminals of the first and second comparators 21 and 22. The driving wheel output torque control circuit 23 serves to control fuel to be supplied to an engine, for example. Although, as stated above, engine output torque may be controlled by several different methods. When the output from first comparator 21 is a low level, a quantity of fuel to be supplied to the engine is decreased to make the fuel mixture lean, or "fuel lean", while when the output from the second comparator 22 is a low level, the supply of fuel is cut altogether, or "fuel cut".

The steering characteristic determining means 37 receives the reference yaw rate $y_b$ from the reference yaw rate generating means 2 and the deviation Dr from the deviation calculation circuit 19, and determines a steering characteristic in response to the inputs Dr and $y_b$. That is, the criteria shown below in Table 1 is preliminarily defined in the steering characteristic determining means 7.

TABLE 1

| | Dr | |
|---|---|---|
| $y_b$ | Positive | Negative |
| Positive | O | U |
| Negative | U | O |

In Table 1, the symbol O stands for oversteering, and the symbol U stands for understeering. The result of the determination in accordance with Table 1 is output from the steering characteristic determining means 37 to the control characteristic correcting means 38.

Figure 5:
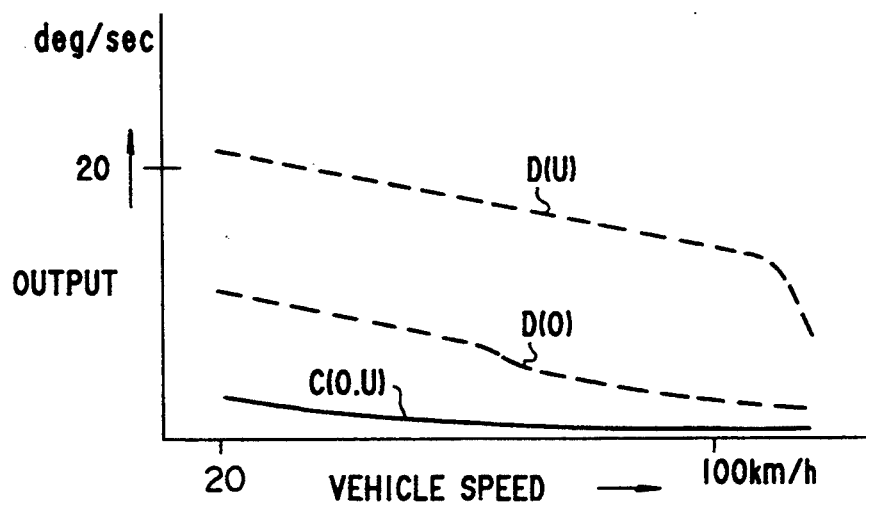
FIG. 5 is a graph illustrating output characteristics of the control characteristic connecting means.

The control characteristic correcting means 38 receives the vehicle speed Vv from the vehicle speed detector 33, the steering angle $\delta$ from the steering angle sensor 34, the signal corresponding to the result of determination from the driving wheel determining circuit 10, and the signal corresponding to the determined steering characteristic from the steering characteristic determining circuit 37. In response to these input signals, the control characteristic correcting means 38 generates signals from an output terminal C connected to a non-inverting terminal of the first comparator 21 and from an output terminal D connected to a non-inverting terminal of the second comparator 22. When the vehicle is a front wheel drive vehicle, and the steering angle $\delta$ is relatively small, the output value from the output terminal C of the control characteristic correcting means 38 is set as shown by the solid line in FIG. 5, for example, and the output value from the output terminal D is set as shown by broken lines in FIG. 5, for example, for example, according to the vehicle speed Vv and the result of determination by the steering characteristic determining means 37. The broken line D(U) represents the output from terminal D, when the vehicle is determined (by steering characteristic determining means 37) to be in an understeering condition, and the broken line D(O) represents the output from terminal D when the vehicle is determined to be in an oversteering condition. When the vehicle is a rear wheel drive vehicle, output values different from those in FIG. 5 are set, and when the steering angle is relatively large, the output values from the output terminals C and D are set to be smaller than those shown in FIG. 5.

In operation, the yaw rate y of the vehicle is obtained by multiplying the difference (Vr−Vl) in wheel speeds between the left and right trailing wheels Wl and Wr by the proportional constant d, and then filtering the product by means of the filter 13 to thereby eliminate the influence of the vibration of the vehicle suspension. Thus, the yaw rate y can be easily obtained with no problems in practical use.

When the absolute value of the deviation Dr, between the yaw rate y as presumed above and the reference yaw rate $y_b$ calculated as a value to be presently desired according to the hysteresis of the steering angle $\delta$ and the hysteresis of the yaw rate y, exceeds the output values from the output terminals C and D of the control characteristic correcting means 8, the driving wheel output torque control means 23 operates to predict or presume that the vehicle will yaw in an undesirable direction, and thus control the yaw motion.

In a front wheel drive vehicle, for example, when an excessive driving force is applied as the vehicle is steered, the vehicle tends to understeer. As a result, when it is detected that the vehicle has yawed in an undesirable direction, the driving wheel torque control circuit 23 operates in response to the outputs from the first and second comparators 21 and 22 to reduce the engine output. In response to the reduction in the engine output, the driving force on driving wheels is reduced, and instead thereof, a limited lateral adhesion of the driving wheels is increased, thereby preventing the understeering condition described above.

On the other hand, in a rear wheel drive vehicle, the vehicle tends to oversteer when an excessive driving force is applied. However, the oversteering may be prevented by reducing the driving force in the same manner as with the front wheel drive vehicle. Thus, when the actual yaw rate y has approached the reference yaw rate $y_b$ by reducing the engine output, the reduction in the engine output is released, and a normal engine output control is restored.

Furthermore, the output values from the output terminals C and D of the control characteristic correcting means 38 are set to be different according to the result of determination of the steering characteristic determining means 37. For example, when an oversteering tendency occurs in a front wheel drive vehicle, the vehicle speed can be decreased to cause the vehicle to become stable before the vehicle enters an oversteering condition since the output value from the output terminal D is set to be smaller than the output value from the output terminal C. Further, in both the oversteering and the understeering conditions, the output from the first comparator 21 becomes a low level before the output from the second comparator 22 becomes a low level, and accordingly the driving wheel output torque control circuit 23 operates to lean the fuel mixture supplied to the engine, thus gradually decreasing the driving force. In this manner, by gradually reducing the driving force it is possible to avoid the problem of over-controlling.

When the steering angle $\delta$ is large at low vehicle speeds, the steering characteristic of the vehicle becomes non-linear, but the reference yaw rate $y_b$ generated from the reference yaw rate generating means 2 is linear. Therefore, the deviation Dr between the reference yaw rate $y_b$ and the yaw rate y becomes large. However, since the output values from the control characteristic correcting means 38 to the first and second comparators 21 and 22 are set so as to become small as the vehicle speed Vv increases. Accordingly, it is possible to prevent over-control at low vehicle speeds, and also to achieve appropriate control at high vehicle speeds.

Further, since the output values from the control characteristic correcting means 38 are set so as to decrease as the steering angle $\delta$ increases, the output from the first comparator 21 or the second comparator 22 tends to become a low level output. Accordingly, it is possible to prevent undercontrol due to an increased inertia force of the yaw motion when the steering wheel H is steered at a large angle.

Further, since the output values from the control characteristic correcting means 38 varies according to whether the driving wheels are the front wheels or the rear wheels, it is possible to provide proper control of the yaw motion in response to a steering characteristic which varies according to whether the vehicle is a front wheel drive vehicle or a rear wheel drive vehicle.

Moreover, the driving wheel output torque control circuit 23 operates to select the control mode for making the fuel mixture lean or the control mode for cutting the fuel supply to the engine according to the output from the control characteristic correcting means 38. Accordingly, more precise control can be provided as compared with only a control mode for simply cutting the fuel supply. Thus, driver and passenger discomfort due to a large torque differences may be prevented and therefore over-control of the vehicle can also be prevented.

Figure 3:
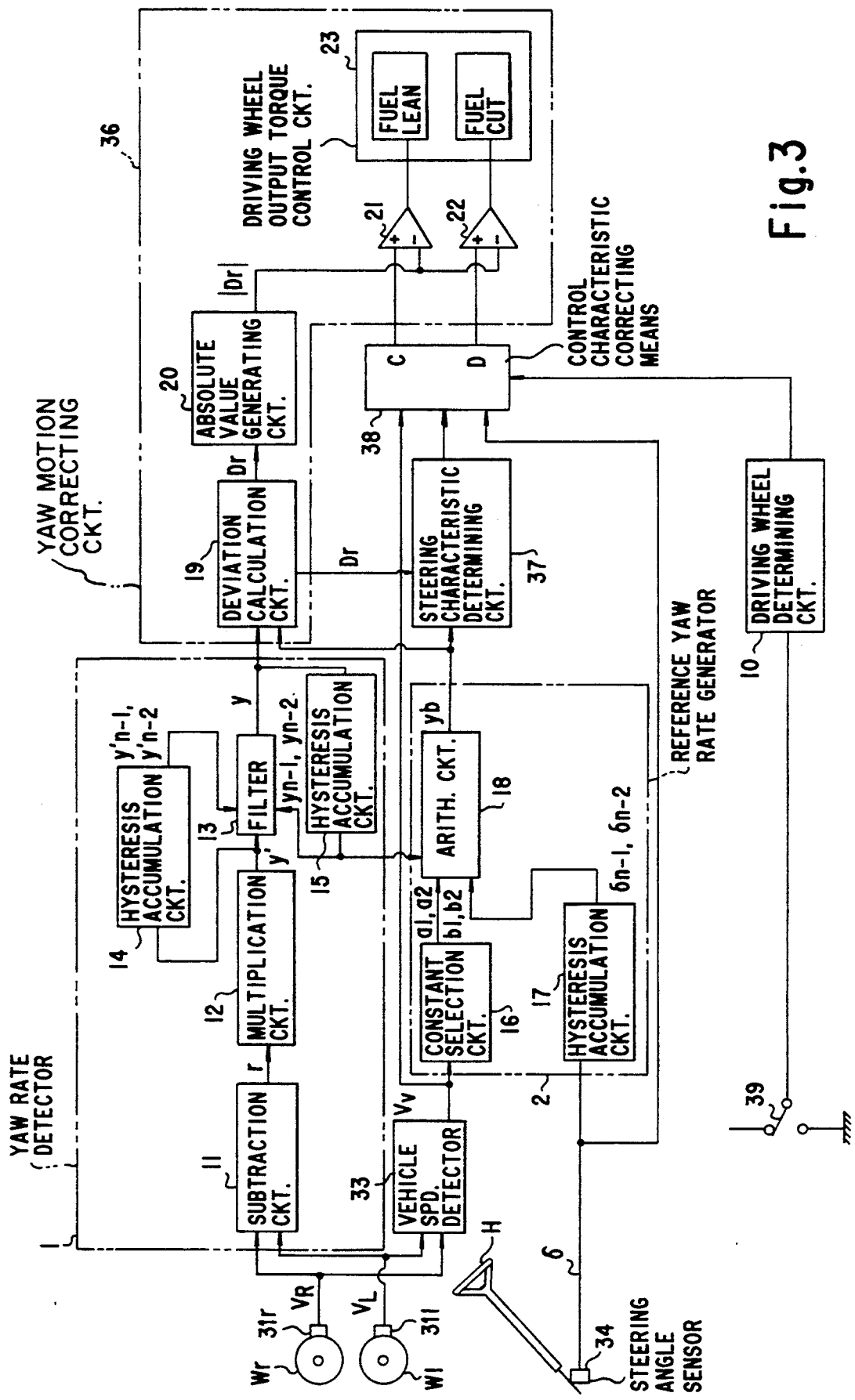
FIG. 3 is a block diagram of a second embodiment of the instant invention.
Figure 6:
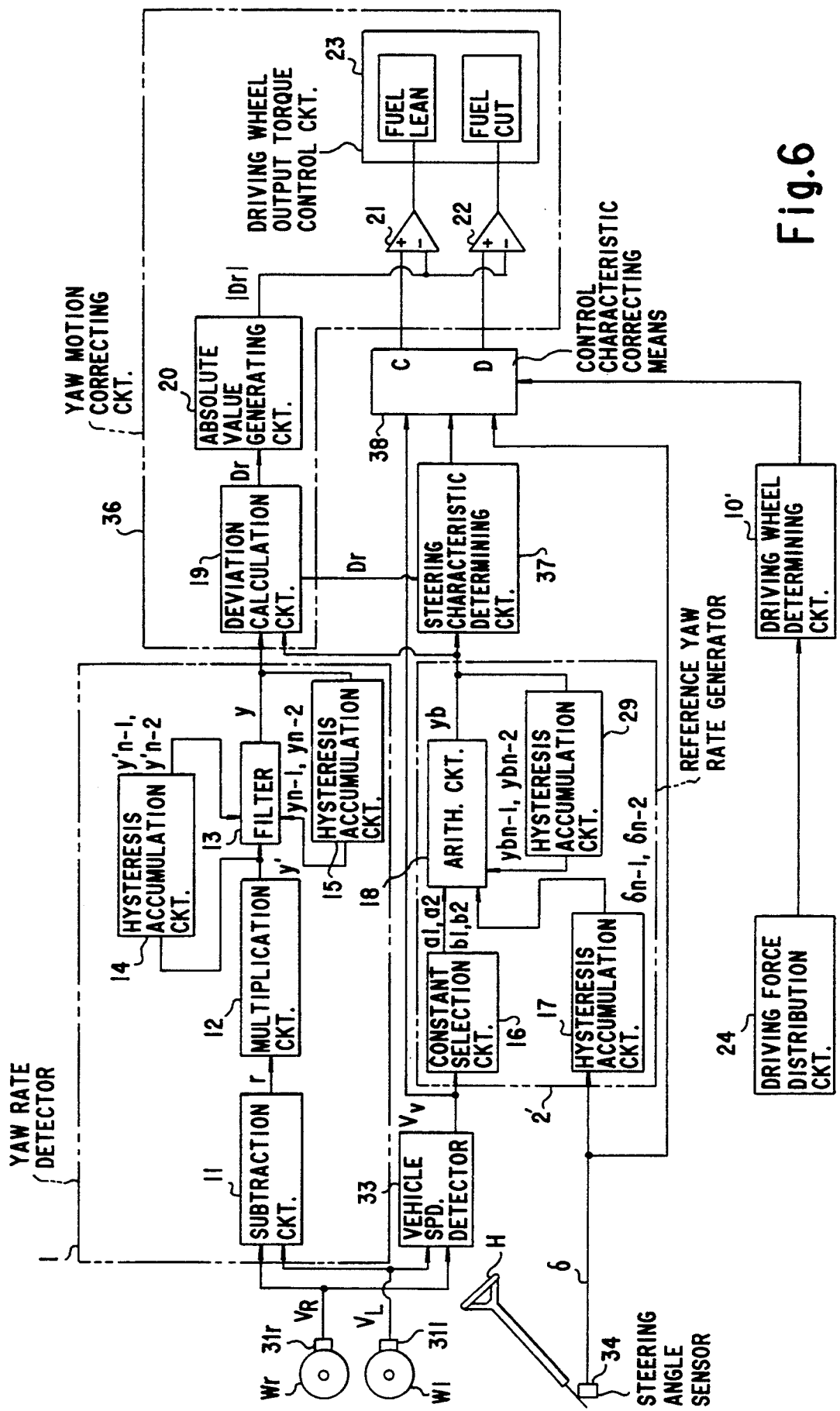
FIG. 6 is a block diagram of a third embodiment of the instant invention.

FIG. 6 shows a third embodiment of the present invention, wherein elements corresponding in FIG. 3 are designated by the same reference numerals.

Arithmetic circuit 18' in reference yaw rate generating means 2' calculates a reference yaw rate $y_b$ in accordance with the following equation:

$$y_b = -a_1{}^*y_{bn-1} - a_2{}^*y_{bn-2} + b_1{}^*\delta_{n-1} + b_2{}^*\delta_{n-2} \qquad (3)$$

That is, the hysteresis of the reference yaw rate $y_b$ obtained by the arithmetic circuit 18' is accumulated in a hysteresis accumulation circuit 29 (also referred to as a reference yaw rate memory means). Arithmetic circuit 18' receives the hysteresis $y_{bn-1}$ and $y_{bn-2}$ of the reference yaw rate $y_b$ from the hysteresis accumulation circuit 29 and the hysteresis $\delta_{n-1}$ and $\delta_{n-2}$ of the steering angle $\delta$ from the hysteresis accumulation circuit 17 to calculate the reference yaw rate $y_b$.

A signal from a driving force distribution circuit 24 is input to a driving wheel determination circuit 10'. The driving force distribution circuit 24 serves to control the distribution ratio of the driving force between the front and the rear wheels of the vehicle. The distribution ratio of the driving force is detected by the driving wheel determination circuit 10', and is input to the control characteristic correcting means 38.

According to the first and second embodiments, since the reference yaw rate $y_b$ is calculated according to the hysteresis of yaw rate y, as a correction-element, a precise reference yaw rate $y_b$ can be calculated by using actual yaw rate y. However, this is possible only if the yaw rate has no noise components in its signals. In other words, a yaw rate signal which is detected by either a gyroscope sensor or ideal filtered signal detected by the difference speed of the trailing wheels should be used in order to obtain a precise control signal.

According to the third embodiment, since the reference yaw rate $y_b$ is calculated according to the hysteresis of the reference yaw rate $y_b$, the noise influence can be reduced because the actual yaw rate is not used to calculate the reference yaw rate $y_b$. It is possible to get the reference yaw rate $y_b$ according to a large number of hysteresis values of the steering angle (e.g., $y_b = b_1{}^*\delta_{n-1} + \ldots + b_{16}{}^*\delta_{n-16}$). However, the large number of hysteresis values have the same large number of steering response parameters. Therefore a long time is require to set the values for each steering response parameter. In the third embodiment, as the previous hysteresis value of the reference yaw rate signal is used instead of old hysteresis values of the steering angle (e.g., $\delta_{n-3} \ldots \delta_{n-16}$), the large number of terms can be reduced in order to avoid long setting times for each parameter.

According to another aspect of the invention, the vehicle speed detector 33 may output as the vehicle speed Vv an average of the wheel speeds Vl and Vr of the trailing wheels Wl and Wr.

Although the above-mentioned embodiments employ the system of comparing the deviation Dr between the reference yaw rate $y_b$ and the actual yaw rate y with a reference value, an engine output (e.g., throttle opening) may be controlled in proportion to the difference between the deviation Dr and the reference value. Further, although the reference yaw rate $y_b$ is calculated from the hysteresis (n−1, n−2) at the last time and the before-last time in the previous embodiments, the reference yaw rate $y_b$ may be calculated from the hysteresis (n−1, n−2, n−3, ...) using as many previous values as desired with or without the hysteresis of the reference yaw rate $y_b$.

Although a specific forms of embodiment of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention as set forth in the following claims.

We claim:

1. A sensor for detecting a dynamic vehicle condition corresponding to yaw motion, comprising:
    a detecting means for detecting wheel speed of left and right trailing wheels of the vehicle;
    a calculating means for receiving the wheel speeds from said detecting means and calculating the difference therebetween; and
    a filter means, receiving the output of said calculating means, for eliminating signal noise caused by vibration of vehicle wheels and suspension.

2. The yaw rate sensor of claim 1, wherein said filter means is a recursive type filter.

3. The yaw rate sensor of claim 2, further comprising a multiplication means, interposed between said calculating means and said filter means, for outputting an approximate yaw rate value by multiplying said difference by a constant, proportional to the track of said trailing wheels.

4. The yaw rate sensor of claim 3, wherein said filter means includes a yaw rate memory means, receiving the output of said filter, for storing at least a previous value of said yaw rate output from said filter, and for outputting at least said previous value of said yaw rate to an input of said filter.

5. The yaw rate sensor of claim 4, further comprising an approximate value memory means, receiving an output from said multiplication means, for storing at least a previous value of the approximate yaw rate from said multiplication means, and for outputting at least said previous value of the approximate yaw rate from said multiplication means to said filter means.

6. The yaw rate sensor of claim 5, wherein said yaw rate ($y_n$) output from said filter means is determined according to the following equation:

$$y_n = \alpha_1 y_{n-1} + \alpha_2 y_{n-2} + \alpha_3 y_{n-3} + \beta_1 y'_n + \beta_2 y'_{n-1} + \beta_3 y'_{n-2}$$

where $\alpha_1 \ldots \alpha_3$, and $\beta_1 \ldots \beta_3$ are predetermined constants, $y_{n-1} \ldots y_{n-3}$ represent previous values of yaw rate ($y_n$) from said yaw rate memory means, and $y'_n \ldots y'_{n-2}$ represent previous values of an approximate yaw rate value (y') from said approximate value memory means.

7. A sensor for detecting a dynamic vehicle condition corresponding to yaw motion of a vehicle, comprising:
    a detecting means for detecting wheel speeds of left and right trailing wheels of the vehicle and producing separate output signals representing a left wheel speed of said left trailing wheel and a right wheel speed of said right trailing wheel;
    a yaw rate determining means, receiving said output signals from said detecting means representing the wheel speeds, for determining an approximate yaw rate by determining a product of a constant and a difference value, said difference value representing a difference between said left wheel speed and said right wheel speed, said constant having a value representing a distance between centerlines of said left and right trailing wheels; and
    a filter means, receiving the output of said yaw rate determining means, for eliminating signal noise caused by vibration of vehicle wheels and suspension.

8. A sensor for detecting a dynamic vehicle condition corresponding to yaw motion, comprising:
    a detecting means for detecting wheel speed of left and right trailing wheels of the vehicle;
    a yaw rate determining means for receiving the wheel speeds from said detecting means, calculating a difference between said wheel speeds, and determining an approximate yaw rate based on said difference; and
    a filter means, receiving the output of said calculating means representing said approximate yaw rate, for eliminating signal noise caused by vibration of vehicle wheels and suspension.

* * * * *

UNITED STATES PATENT AND TRADEMARK OFFICE
CERTIFICATE OF CORRECTION

PATENT NO. : 5,333,058
DATED : July 26, 1994
INVENTOR(S) : Shiraishi, et al

It is certified that error appears in the above-indentified patent and that said Letters Patent is hereby corrected as shown below:

On the title page, item [30], fourth, fifth, and sixth lines, the priority date "Oct. 3, 1987" should read --Oct. 2, 1987--.

Signed and Sealed this

Fourteenth Day of March, 1995

Attest:

BRUCE LEHMAN

Attesting Officer  Commissioner of Patents and Trademarks